(12) United States Patent
Permans

(10) Patent No.: US 7,704,538 B2
(45) Date of Patent: Apr. 27, 2010

(54) NON-STICKY, FREE-FLOWING COMESTIBLE AND A PROCESS FOR ITS PREPARATION

(75) Inventor: Johan Augusta Maria Antoon Permans, Ekeren (BE)

(73) Assignee: Cerestar Holding B.V., Le Sas Van Gent (NL)

( * ) Notice: Subject to any disclaimer, the term of this patent is extended or adjusted under 35 U.S.C. 154(b) by 1530 days.

(21) Appl. No.: 10/506,183

(22) PCT Filed: Mar. 13, 2003

(86) PCT No.: PCT/EP03/02598

§ 371 (c)(1), (2), (4) Date: Aug. 31, 2004

(87) PCT Pub. No.: WO03/077676

PCT Pub. Date: Sep. 25, 2003

(65) Prior Publication Data

US 2005/0147717 A1    Jul. 7, 2005

(30) Foreign Application Priority Data

Mar. 19, 2002 (GB) ................... 0206419.4

(51) Int. Cl.
*A23L 1/0522* (2006.01)
(52) U.S. Cl. .............. 426/102; 426/289
(58) Field of Classification Search ............. 426/96, 426/102, 289
See application file for complete search history.

(56) References Cited

U.S. PATENT DOCUMENTS

| | | | | | |
|---|---|---|---|---|---|
| 2,884,413 | A | * | 4/1959 | Kerr et al. ............... | 536/106 |
| 3,527,646 | A | * | 9/1970 | Jokay et al. ............. | 426/289 |
| 3,930,034 | A | * | 12/1975 | Shanbhag et al. ........ | 426/104 |
| 4,256,772 | A | * | 3/1981 | Shanbhag et al. ........ | 426/331 |
| 4,465,698 | A | * | 8/1984 | Bussiere et al. ......... | 426/102 |

FOREIGN PATENT DOCUMENTS

| | | |
|---|---|---|
| EP | 0 512 274 A1 | 11/1992 |
| EP | 0 547 551 A1 | 6/1993 |
| EP | 0 819 387 A2 | 1/1998 |
| EP | 0 901 756 A2 | 3/1999 |
| WO | WO 99/64467 * | 12/1999 |

OTHER PUBLICATIONS

Cargill, Food and Pharma Specialties PolarTex 06748, Jan. 3, 2003. pp. 1-2.*
Time-Life Editors. The Good Cook Techniques and Recipes, Candy. 1981. p. 133.*
Fennema Owen (ed), Food Chemistry Third Edition, Marcel Dekker Inc 1996. pp. 201-204.*
Jokay etal., "Development of Edible Amylaceous Coatings for Foods", Food Technology, vol. 21, pp. 1064-1066, (Aug. 1967).
Thys et al., Modified Starches for Fruit Preparation, Food Manufacture, vol. 73, No. 11, pp. 18-20, (Nov. 1998).
Kittur et al., "Polysaccharide-based Composite Coating Formulations For Shelf-life Extension of Fresh Banana and Mango", European Food Research and Technology, vol. 213, No. 415, pp. 306-311 (2001).
Riedel, "Precoating of Centres", Confectionery Production (Feb. 1996).

* cited by examiner

*Primary Examiner*—Lien Tran
*Assistant Examiner*—Kelly Bekker

(57) ABSTRACT

A non-sticky, free-flowing product comprises a candied or infused, internally-moist, solid comestible having a surface coating comprising as main ingredient a dry starch derivative selected from starch phosphate esters, hydroxyalkyl starches phosphate esters and mixtures thereof. Typically, the candied or infused, internally-moist solid comestible is selected from candied or infused ginger pieces, whole fruit or fruit pieces. The product may be used as a food ingredient, for instance in bakery products, cereal products, ice cream and dairy products.

6 Claims, No Drawings

NON-STICKY, FREE-FLOWING COMESTIBLE AND A PROCESS FOR ITS PREPARATION

This application is the U.S. National phase filing of PCT/EP03/02598, filed Mar. 13, 2003, the complete disclosure of which is incorporated herein by reference, and which was published under PCT Article 21(2) in English.

TECHNICAL FIELD

This invention relates to non-sticky, free-flowing comestibles and to a method of preparing such comestibles. In particular, it relates to non-sticky, free-flowing products comprising candied or infused, internally-moist, solid comestibles, such as fruit.

BACKGROUND

Small dried fruit pieces are a popular industrial food ingredient used in a wide range of products including bakery products, trail mixes and cereal products, ice cream and dairy products.

In order to stabilise and preserve fruits, the fruits, or pieces of fruits, are subjected to partial dehydration. However, fruit which is dehydrated sufficiently to prevent spoiling is generally hard with a tough fibrous texture and does not readily reconstitute to a soft acceptable texture. Several techniques are known to obtain partially dried fruits having enhanced softness properties. One such technique is the infusion of partially dried fruits by immersion in a sugar syrup such as a glucose syrup, fructose syrup or corn syrup.

In a further development of the above technique dried fruits may be infused with an aqueous solution containing sugar together with an edible polyhydric alcohol such as glycerol, sorbitol or mannitol, as describe in U.S. Pat. No. 4,256,772 relating to improved shelf-stable breakfast foods.

Infused or candied (i.e. preserved and/or coated with a sugar-containing solution and/or crystalline sugar) fruit or fruit pieces are often sticky and tend to clump together. Such a property impairs the flow characteristics and, thus, the handling and the use of the fruit products. This problem creates difficulties when the treated fruit is used in production operations since special handling to break up the clumps of fruit is required.

U.S. Pat. No. 4,256,772 proposes to alleviate this problem by dusting the infused or candied fruit products with a moisture binder such as finely ground corn, tapioca or potato starch. However, on standing, clumping and further dehydration of the product may still occur.

Typically, in order to improve the handling properties of such coated products these may be subjected to drying for at least 24 hours in order to obtain a product which is more or less flowing and not sticky. This drying process is very time and space consuming.

WO 94/02026 describes a process for coating candied fruit with a calcium or aluminium alginate or pectate gel to reduce manipulation problems caused by the sticky surface of the fruit. However, this is a complex process involving soaking the fruit in two successive solutions, followed by drying the fruit.

EP-A-584976 describes the use of a calcium citrate compound for coating dried or infused fruit in order to decrease surface stickiness, to improve storage and handling characteristics, to improve storage of the dried fruits in combination with dry cereals.

U.S. Pat. No. 3,527,646 relates to a method of coating foods with an edible amorphous film containing a pregelatinised starch. The film provides a grease barrier whereby fatty foods, which normally exude oils and fats, remain dry and non-greasy.

EP-A-547551 relates to edible films that serve as effective physical barriers to the passage of water, lipid, solute, gas, or microbes into, out of or within foods, pharmaceuticals and other edible products. These films comprises blends of starch, gelatine, plasticiser, water and optionally lipid.

Riedel in Confectionery Production (1996, Vol 62 No. 2, page 86-87) describes precoating of centres by applying precoating agents consisting of starch products, maltodextrins and modified starch. The precoating agent consists of a liquid and powder agent.

EP-A-819387 describes the use of thinned hydroxypropylated starches as coating or precoating composition used in precoating of chewing gum, nuts and other foodstuffs.

Jokay in Food Technology, Institute of Food Technologists, Chicago, US (Vol 21, No 8, 1967, page 1064-660) describes in general terms the development of edible amylaceous coatings for foods.

U.S. Pat. No. 4,256,772 relates to a method of preparing cereal products containing soft, semi-moist fruit and/or fruit pieces in which the cereals retain their crispiness.

There remains a continuing need for new and improved processes for making a free-flowing product from candied or infused fruit products.

SUMMARY OF THE INVENTION

The present invention discloses a non-sticky, free-flowing product comprising a candied or infused, internally-moist, solid comestible having a surface coating comprising as main ingredient a dry starch derivative selected from starch phosphates esters, hydroxyalkyl starch phosphate esters and mixtures thereof. Said dry starch derivative is maize based, preferably waxy maize based starch. Furthermore said dry starch derivative is a cook-up starch. In a specific embodiment said dry starch derivative is hydroxypropylated waxy maize distarch phosphate.

The current invention further relates to candied or infused ginger pieces, candied or infused fruit wherein the fruit is selected from whole fruit units and fruit pieces. The fruit is further selected from raisins, currants, grapes, dates, figs, prunes, plums, apples, pears, bananas, peaches, apricots, nectarines, pineapples, strawberries, raspberries, blueberries, cranberries, cherries and citrus fruits.

The current invention discloses infused, internally-moist, solid comestible infused with an infusion material selected from carbohydrate sweeteners, polyol sweeteners, polyhydric alcohols, and mixtures thereof. The infusion material is selected from glycerol, propylene glycol, butylene glycol, glucose, fructose, sucrose, starch hydrolysate, maltitol, isomalt, sorbitol, lactitol, mannitol, erythritol, xylitol and mixtures thereof.

Furthermore, the current invention relates to a process for preparing a non-sticky free-flowing product comprising a candied or infused, internally-moist solid comestible and said process is comprising the following steps:
a) Infusing of solid comestible with infusing material for obtaining candied or infused solid comestible,
b) Coating said candied or infused solid comestible with a dry starch derivative selected from the group consisting of starch phosphate esters, hydroxyalkyl starch phosphate esters and mixtures thereof for obtaining a non-sticky and free-flowing product without a drying stage.

The current invention relates to a process wherein in step b) said dry starch derivative is hydroxypropylated waxy maize di-starch phosphate. The solid comestible is selected from ginger pieces, whole fruit units and fruit pieces and the infusing material is selected from carbohydrate sweeteners, polyol sweeteners and polyhydric alcohols, and mixtures thereof.

The current invention further relates to the use as an anti-sticking coating for candied or infused, internally-moist, solid comestibles, of a starch derivative selected from starch phosphates esters, hydroxyalkyl starch phosphate esters and mixtures thereof. In particular it relates to the use of hydroxypropylated waxy maize di-starch phosphate.

The current invention further relates to a food product comprising the non-sticky, free-flowing product of the current invention and one or more other ingredients. The food product is selected from bakery products, trial mixes, cereal products, ice cream and dairy products.

DETAILED DESCRIPTION OF THE INVENTION

The present invention provides, in a first aspect, a non-sticky, free-flowing product comprising a candied or infused, internally-moist, solid comestible having a surface coating comprising as main ingredient a dry starch derivative selected from starch phosphates esters, hydroxyalkyl starch phosphate esters and mixtures thereof. In a preferred embodiment the surface coating is consisting of a dry starch derivative selected from starch phosphate esters, hydroxyalkyl starch phosphate esters and mixtures thereof.

The present invention provides, according to a second aspect, a process for preparing a non-sticky free-flowing product comprising a candied or infused, internally-moist solid comestible and said process is comprising the following steps:
 a) Infusing of solid comestible with infusing material for obtaining candied or infused solid comestible,
 b) Coating said candied or infused solid comestible with a dry starch derivative selected from the group consisting of starch phosphate esters, hydroxyalkyl starch phosphate esters and mixtures thereof for obtaining a non-sticky and free-flowing product without a drying stage.

Typically, before and/or after the coating step there is no drying step is involved in the process.

According to a further aspect, the invention provides the use, as an anti-sticking coating for candied or infused, internally-moist, solid comestibles, of a starch derivative selected from starch phosphates esters, hydroxyalkyl starch phosphate esters and mixtures thereof.

The starch derivative used to form a non-sticky coating on the surfaces of the candied or infused, internally-moist, solid comestibles is a starch phosphate ester hydroxyalkyl starch phosphate ester or a mixture of these. The starch used to prepare the hydroxyalkyl phosphate ester or the phosphate ester derivative is preferably waxy maize starch. According to a preferred embodiment, the hydroxyalkyl starch phosphate ester is hydroxypropylated waxy maize di-starch phosphate since this provides a coating, on the comestible, which is transparent and which has a neutral taste, both critical features for the acceptability of a coated comestible, such as a candied or infused fruit product. Such a starch derivative is available from Cerestar under the trade name C☆Polattex 06748.

Preferably, the starch derivative coating material will be finely-divided. By the term "finely-divided" we mean that the starch derivative will have a particle size sufficiently small to enable it to be applied to the surfaces of the comestible to be coated by spraying or dusting.

The candied or infused, internally-moist, solid-comestible is, according to an especially preferred embodiment candied or infused ginger or fruit.

Examples of fruit include raisins, currants, grapes, dates, figs, prunes, plums, apples, pears, bananas, peaches, apricots, nectarines, pineapples, strawberries, raspberries, blueberries, cranberries, cherries and citrus fruits.

The ginger or fruit will be candied or infused and may be, but need not be, partially dehydrated. If the ginger or fruit material, prior to being coated in accordance with the invention, has been infused it will, typically, have been infused, i.e. soaked in, an infusion material such as solutions or syrups of carbohydrate sweeteners, polyol sweeteners, polyhydric alcohols or mixtures thereof. The infusion of fruit by such materials is well known in the art. Examples of infusion materials include, but are not limited to, glycerol, propylene glycol, butylene glycol, glucose, sucrose, fructose, starch hydrolysate, maltitol, isomalt, sorbitol, lactitol, mannitol, erythritol, xylitol and mixtures thereof.

It will be understood that the invention may be applied to whole fruits or fruit pieces, depending on the size of the fruit and the size of product required for the food ingredient.

Thereof, wherever the term "fruit" is used herein, fruit pieces are also included, and vice versa.

The amount of the coating material, which according to a preferred embodiment is hydroxypropylated waxy maize di-starch phosphate, used to coat the solid comestible will typically be within the range of from 4 to 6% by weight based on the weight of the comestible. This is substantially lower than the typical amount of a conventional saccharose (sucrose) coating used on candied or infused fruit (about 15% by weight based on the weight of the fruit) or of a conventional rice starch coating (about 10% by weight).

The coating may be applied to the comestible by a technique known generally in the art of coating candied or infused fruit. Typically, the coating material may be applied to the surfaces of the comestible by spraying or dusting.

No drying step is required after coating by using the process of the invention.

This provides a significant advantage over existing processes in terms of time, storage space and energy costs and avoids the weight loss which occurs during drying.

The current process has in addition the advantage that the infused solid comestible can immediately be coated without an intermediate drying step. Again this provides a significant advantage over existing processes in terms of time, storage space and energy costs.

The coated fruit products obtained by the process of the invention are free-flowing.

Whereas rice starch or sucrose coatings of conventional processes are opaque, the coating of the invention is transparent and has neutral taste, both critical features for the acceptability of the coated fruit product.

The invention may be applied to any candied or infused fruit products or ginger, as mentioned above. It is within the scope of the invention to use, as the internally-moist comestible, any other comestible which could benefit from the provision, on its surface, of a coating to render it non-sticky and free-flowing.

The coated comestible can be packed and/or frozen and may be used in a wide range of food products including bakery products, trail mixes and cereal products, ice cream and dairy products.

These food products can be prepared by adding, optionally with mixing, the non-sticky, free-flowing product of the current invention to one or more ingredients.

The invention is illustrated by way of the following examples.

EXAMPLE

Candied fruit was prepared at 56-72° brix by adding glucose syrup (C☆Sweet F 01838 Tradename Cerestar).

100 g of this candied fruit was brought into a plastic vessel and 5 g hydroxypropylated waxy maize di-starch phosphate (C☆Polartex 06748 Tradename Cerestar) was sprayed on the candied fruit.

Immediately a free-flowing product was obtained, and no drying step was involved. The product was further evaluated after 1 week and 6 weeks.

Each time a free-flowing non-sticky product was observed.

The invention claimed is:

1. A process of preparing a non-sticky free-flowing product comprising a candied or infused, internally-moist solid comestible and said process is comprising the following steps:
    a) infusing of solid comestible with infusing material for obtaining candied or infused solid comestible,
    b) coating said candied or infused solid comestible with a dry starch derivative selected from the group consisting of starch phosphate esters, hydroxyalkyl starch phosphate esters and mixtures thereof, and
    c) obtaining said non-sticky and free-flowing product without a drying stage.

2. A process according to claim 1, wherein in step b) said dry starch derivative is hydroxypropylated waxy maize di-starch phosphate.

3. A process according to claim 1 or 2, wherein in step a) said solid comestible is selected from ginger pieces, whole fruit units and fruit pieces.

4. A process according to any one of claims 1 or 2, wherein in step a), the infusing material is selected from carbohydrate sweeteners, polyol sweeteners, polyhydric alcohols, and mixtures thereof.

5. A process according to claim 1, wherein said dry starch derivative is a waxy maize-based starch.

6. A process according to claim 1, wherein coating said candied or infused solid comestible with a dry starch derivative includes coating said candied or infused solid comestible with about 4 to about 6 percent of a dry starch derivative.

* * * * *